(12) United States Patent
Maximilien et al.

(10) Patent No.: US 8,366,165 B2
(45) Date of Patent: Feb. 5, 2013

(54) BEDFRAME, BED COMPRISING THIS FRAME, AND METHOD FOR FITTING A MOTOR VEHICLE WITH THIS BED

(76) Inventors: Richard Maximilien, Romorantin Lanthenay (FR); Marc Legrand, Romorantin Lanthenay (FR)

( * ) Notice: Subject to any disclaimer, the term of this patent is extended or adjusted under 35 U.S.C. 154(b) by 1021 days.

(21) Appl. No.: 11/917,116

(22) PCT Filed: Jun. 6, 2006

(86) PCT No.: PCT/FR2006/001271
§ 371 (c)(1),
(2), (4) Date: Dec. 16, 2008

(87) PCT Pub. No.: WO2006/131634
PCT Pub. Date: Dec. 14, 2006

(65) Prior Publication Data
US 2009/0134648 A1    May 28, 2009

(30) Foreign Application Priority Data
Jun. 8, 2005    (FR) ...................................... 05 05822

(51) Int. Cl.
*B60P 3/38*    (2006.01)
(52) U.S. Cl. .................... 296/24.33; 5/118; 296/1.07
(58) Field of Classification Search ................ 296/1.07, 296/24.38, 24.33, 24.44; 5/112–118, 157
See application file for complete search history.

(56) References Cited

U.S. PATENT DOCUMENTS

| 105,069 | A | * | 7/1870 | Hall et al. ......................... 5/157 |
| 2,232,353 | A | | 2/1941 | Votypka |
| 4,443,034 | A | | 4/1984 | Beggs et al. |

FOREIGN PATENT DOCUMENTS

| DE | 10014316 A1 | 10/2001 |
| EP | 1419955 A | 5/2004 |
| FR | 638419 A | 5/1928 |
| JP | 09142196 A | 10/1997 |
| JP | 09309378 A | 12/1997 |

* cited by examiner

*Primary Examiner* — Glenn Dayoan
*Assistant Examiner* — Melissa A Black
(74) *Attorney, Agent, or Firm* — Browdy and Neimark, PLLC (57) ABSTRACT

The frame comprises a base (32), two telescopic siderails (33) and mounting means (35, 46) for pivotally mounting each longitudinal member (33) to said base. This frame can be placed in a stowed position, in which said siderails (33) are, on said base (32), in a retracted and transversal position, and into a position of use, in which the siderails (33) are in an extended and longitudinal position. The frame also comprises means for holding the siderails (33) in an extended and longitudinal position opposite said base. The bed comprises the frame and a number of slats (36). The method comprises the step of providing a bed of this type and a step for putting the base (32) in place on first elements fixed to the vehicle as well as steps for moving the bed from a stowed position and into a position of use.

28 Claims, 10 Drawing Sheets

BEDFRAME, BED COMPRISING THIS FRAME, AND METHOD FOR FITTING A MOTOR VEHICLE WITH THIS BED

The invention is generally concerned with sleeping in a put-you-up bed.

Put-you-up beds are already known that are deployed to obtain an additional sleeping facility.

The invention aims to enable this kind of bed to be stowed away in a particularly simple and convenient way.

To this end, the invention proposes a bedframe, adapted to accommodate a mattress support, characterized in that it includes:
  a base,
  two telescope side rails each having a retracted position and a deployed position,
  means for pivotal mounting of each of said side rails on said base so that each of said side rails can assume a transverse position and a longitudinal position, said frame having a stowed position in which said rails are each in a retracted and transverse position on said base and a position of use in which said side rails are each in a deployed and longitudinal position, and
  on the side opposite said base, means for retaining said side rails in the deployed and longitudinal position.

The bedframe that the invention proposes is therefore compact in its stowed position and the mattress support, like the mattress, can be stowed with or independently of the frame.

This means that the bedframe according to the invention can be used in the most diverse environments, including in a vehicle, with the base positioned on the rear parcel shelf.

In the stowed position, the mattress support can then itself be stowed on the base while the mattress, which is, for example, an inflatable mattress, is placed in another storage area of the passenger compartment.

According to implementation features that are particularly simple and convenient as much in fabrication as in use:
  said base is adapted to be supported by first predetermined elements of a motor vehicle passenger compartment and said retaining means include a member extending between said side rails and predetermined second elements of said passenger compartment; and where applicable
  each of said side rails includes, on the outside, a spacer adapted to come into contact with a lateral wall of said passenger compartment of a motor vehicle; and/or
  said retaining means include a flexible tie adapted to be engaged at one end with one of said side rails and at the other end with an anchor point of said passenger compartment; and where applicable
  said flexible tie is adapted to be engaged at the other end with an upper safety belt anchor point; and/or
  each of said side rails includes retaining means with which said flexible tie is adapted to interengage; and where applicable
  for each of said side rails, said retaining means include a plate fixed to said side rail and having a return, forming a hook, projecting from said side rail; and where applicable
  each of said side rails including, on the outside, a spacer adapted to come into contact with a lateral wall of said passenger compartment, said plate and said spacer include mutual fixing means; or
  said retaining means include a removable leg adapted to be fixed to one of said side rails and to bear on the floor of said passenger compartment; and/or
  said frame includes two openings disposed at a distance from each other on said base; and/or
  said retaining means include at least one foot engaged with one of said side rails, said base and said foot being adapted to rest on the floor; and where applicable
  said retaining means include at least one arm extending obliquely from one of said side rails to said crossmember;
  said frame includes two of said arms;
  said frame includes common means for fixing said foot and said arm to said side rail;
  said pivotal mounting means include two shafts spaced from each other on said base, each of said shafts receiving a ring belonging to a respective one of said side rails; and/or
  said side rails each include a slideway facing the slideway of the other side rail; and where applicable
  one of said slideways accommodates a crossmember, said crossmember being adapted to be disposed between said side rails when each of them is in a deployed and longitudinal position.

The invention also proposes a bed, characterized in that it includes a frame as described hereinabove and a mattress support including a plurality of slats, said bed assuming a stowed state in which said frame is in its stowed position and said slats are stowed on said base, and a state of use in which said frame is in its position of use while said slats are spread out in said slides.

Where applicable, in the state of use of said bed, said slats are disposed lying down in a plane defined by said side rail and said base while in the stowed state of said bed said slats are one against the other, disposed upright, on said base.

And/or the bed further includes a mattress adapted to be spread out on said slats when said frame is in its position of use.

The invention further proposes a method for providing a motor vehicle with a bed, characterized in that it includes the step of procuring a bed as described hereinabove, the step of placing said base on predetermined first elements of said vehicle, and:
  to change said bed from said stowed state to said state of use:
    each of said side rails is moved from its retracted and transverse position to its deployed and longitudinal position;
    each of said side rails is connected to said second predetermined elements by said retaining means;
    said slats are spread out in said slideways of said side rails; and
  to change said bed from the state of use to the stowed state:
    said slats are stowed upright on said base,
    said side rails are separated from said second elements;
    each of said side rails is moved from its deployed and longitudinal position to its retracted and transverse position.

The manoeuvre for stowing the mattress support is therefore independent of stowing the frame.

According to particularly simple and convenient implementation features:
  the method includes the step of placing said base on a rear parcel shelf of said vehicle, said rear parcel shelf then forming said first fixed elements; and/or
  the method includes the step of inclining the seats of said vehicle before moving each of said side rails from its transverse position to its longitudinal position; and/or
  the method includes the step of engaging a flexible tie with, on the one hand, retaining means appropriate to each of said side rails and, on the other hand, an anchor point of the passenger compartment of said vehicle; or the method includes the step of deploying on each of said side rails a removable foot bearing on the floor of the passenger compartment of said vehicle; and/or the method includes the step of disposing a crossmember between said side rails, each in a deployed and longitudinal position, opposite said base; and/or the method includes the step of placing a mattress on said slats through opening panels of said vehicle.

The features and advantages of the invention will emerge from the following description, given by way of preferred but nonlimiting example with reference to the appended drawings, in which.

With reference to FIGS. 1 to 15, the motor vehicle 1 according to the invention includes a passenger compartment 2 delimited by bodywork having lateral walls 3, a floor 4 and a ceiling 5.

Figure 1:
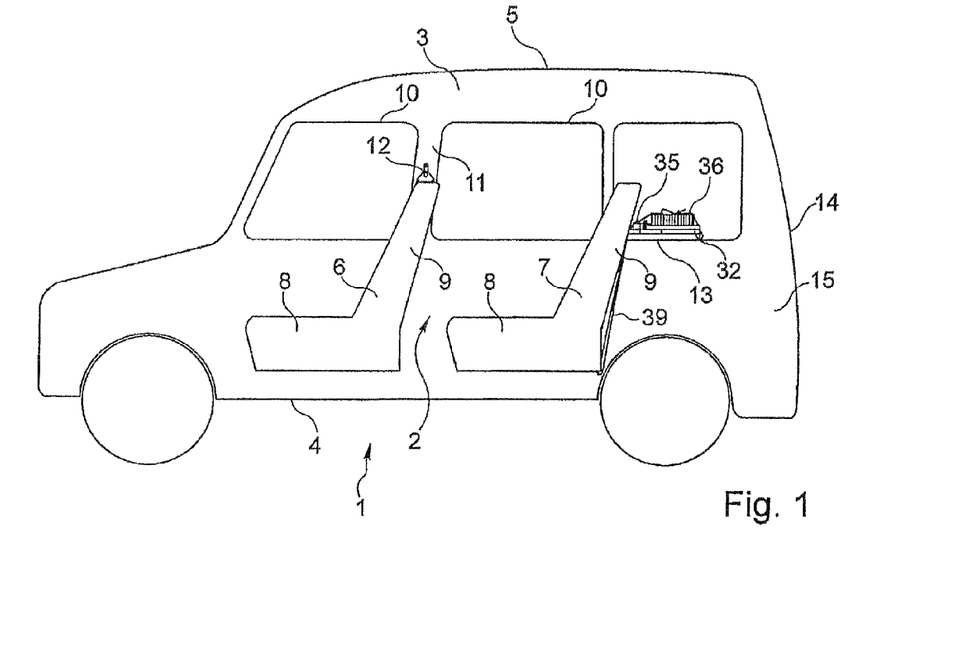
FIG. 1 is a view partially in section of a motor vehicle according to the invention, the seats being raised and the bed being stowed.

In the passenger compartment 2 there are two front seats 6 and two rear seats 7. Each seat 6, 7 has a seating area 8 substantially parallel to the floor 4 and a seat back 9 substantially transverse to the seating area 8.

The two lateral walls 3 each include a pillar 11 with a door on each side, the doors being situated one behind the other and only their windows 10 being shown. The pillar 11 is elongated and carries on its interior surface an upper safety belt anchor point 12.

Behind the seat backs 9 of the rear seats 7 is a rear parcel shelf 13. This rear parcel shelf 13 is flat and substantially rectangular, and level with the bottoms of the windows. It extends lengthwise between the two lateral walls 3 and widthwise from the rear of the seat backs 9 of the rear seats 7 to half way up the hatch 14 of the vehicle 1. With the rear surfaces of the rear seats 9, the floor 4 and the hatch 14 it delimits a boot 15.

The hatch 14 includes a door the pillar of which is horizontal, on the same side as the roof of the vehicle 1. It includes means (not shown) for opening the hatch 14 accessible from inside the passenger compartment 2.

Here the lateral walls 3 further include two rear quarter-lights 16 level with the windows 10 and extending between the seat back 9 of a rear seat 7 and the hatch 14.

The doors, the windows and the hatch form opening panels of the vehicle.

Figure 2:
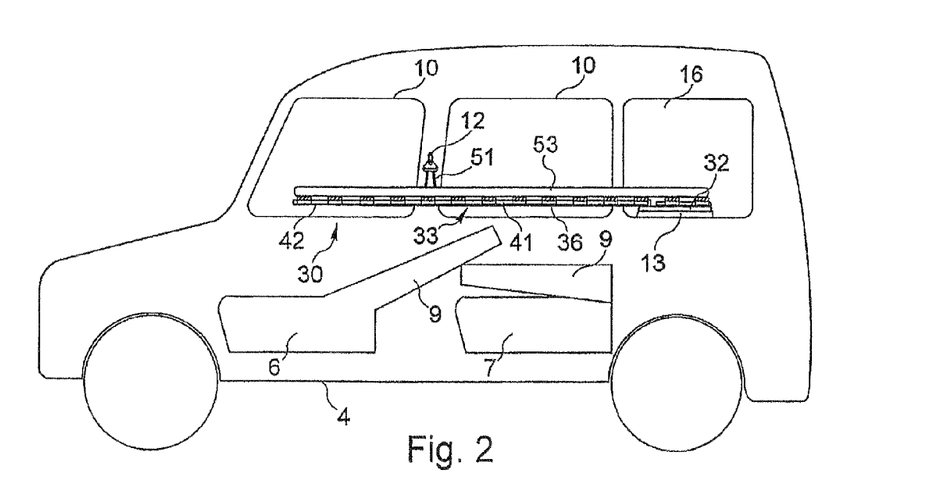
FIG. 2 is a view similar to that of FIG. 1 in which the bed is deployed, the retaining means being a flexible tie retaining the side rail shown to a seat belt anchor point.
Figure 4:
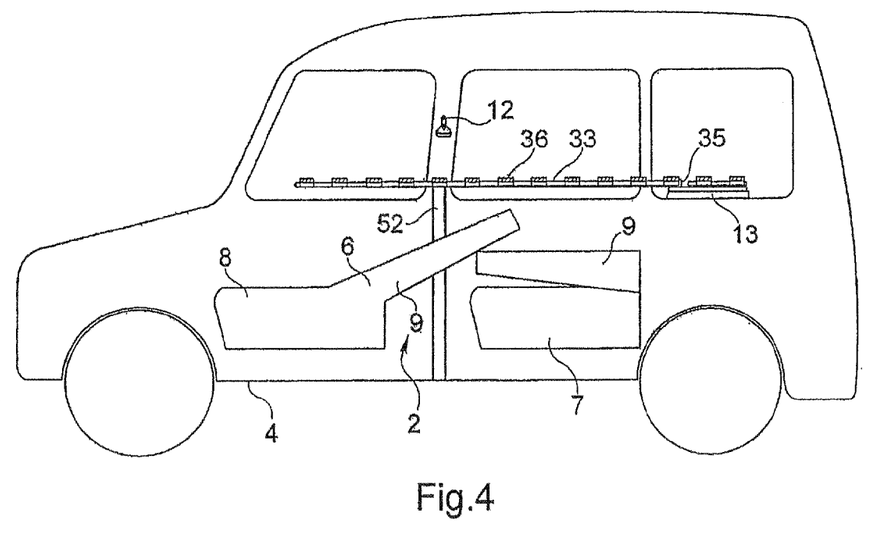
FIG. 4 is a view similar to that of FIG. 2 of a variant of the bed represented in FIGS. 1 and 2, the retaining means being a leg resting on the floor of the vehicle.

As seen in FIGS. 2 and 4, the front seats 16 each have a seat back 9 that can be inclined toward the rear while the seat back 9 of each of the rear seats 7 can be folded forward.

When they are respectively inclined and folded, the height of the seats 6, 7 is significantly reduced compared to the height of those same seats 6, 7 in the standard position of use, i.e. the position as represented in FIG. 1.

For fixing it, the rear parcel shelf 13 here includes, on each of its lateral edges (facing a lateral wall 3), a retaining finger that cooperates with a groove formed in a part attached to said lateral walls 3. These fingers are situated on the same side as the rear seat 7.

The rear parcel shelf 13, and more particularly the portions of the rear parcel shelf 13 near its edges in contact with the lateral walls 3, rests on trims projecting relative to the lateral wall.

The vehicle 1 also includes a bed 30.

This bed 30 includes a folding frame 31 having a base 32, two side rails 33, a crossmember 34 and two shafts 35.

The bed 30 further includes slats 36 cooperating with the frame 31. The slats 36 form a mattress support for the bed 30.

The base 32 has substantially the same dimensions and shape as the rear parcel shelf 13. This base 32 has a rectangular general shape.

Figure 6:
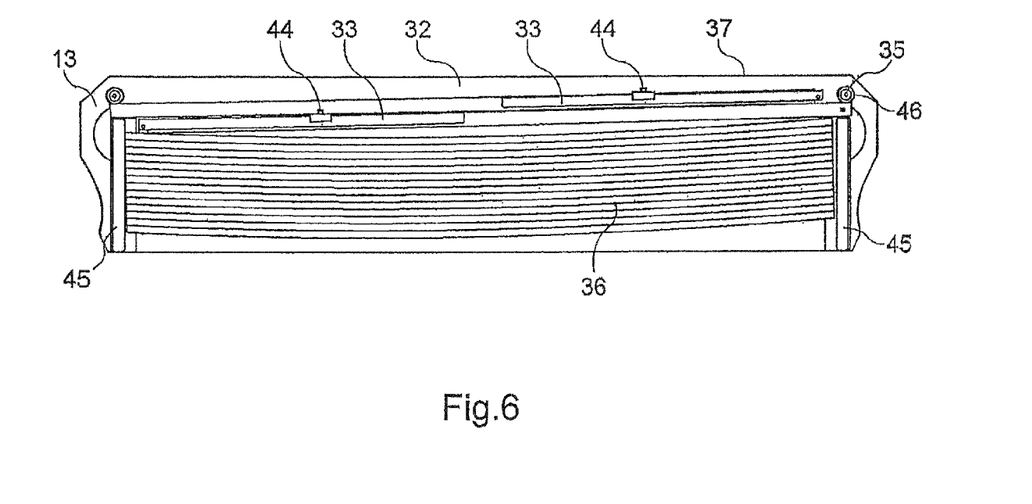
FIG. 6 is a plan view of the bed represented in FIG. 1 and with no retaining means in the stowed position.

As seen in FIG. 6, it has two main edges, extending the length of the base 32, parallel to each other and the same length.

The other edges of the base 32 have a shape enabling said base 32 to be inserted between two lateral walls 3. The base has on its edges a shallow recess that is substantially trapezium-shaped. These two recesses face each other and here are situated behind the rear seats 7. Thus the generally rectangular base 32 includes two plane extensions toward the outside each situated toward the main edge 37 intended to come up against the rear seats 7.

The corners of the base 32 are rounded.

Figure 7:
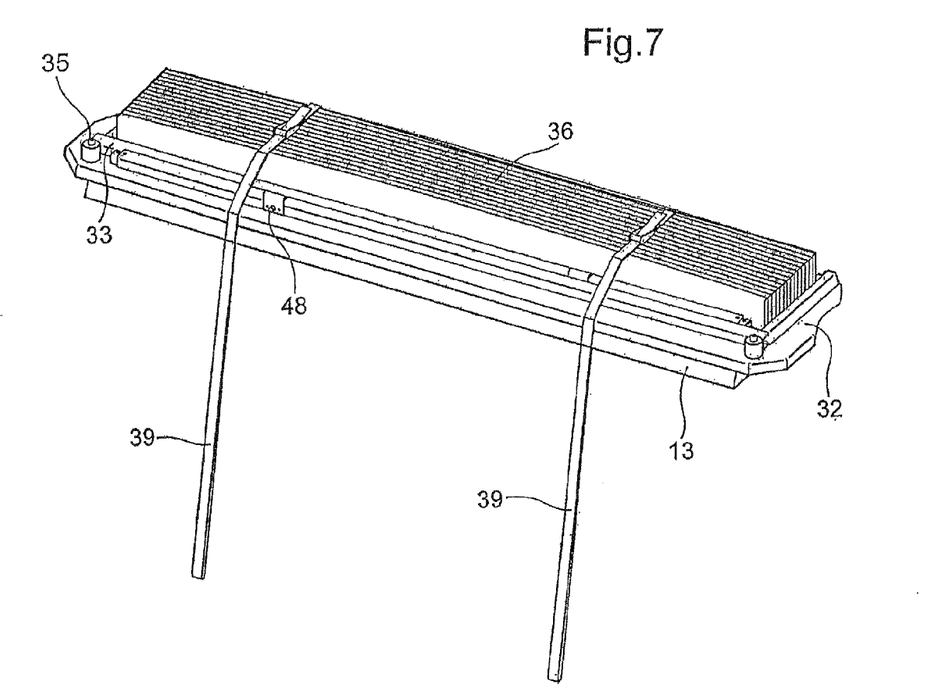
FIG. 7 is a perspective view of the bed from FIG. 6 in which part of fixing means of said base is represented.

Referring to FIGS. 1 and 7, the bed 30 is fixed in the stowed position to the rear parcel shelf and to the floor by two straps 39.

The two straps 39 are positioned away from each other and away from the shafts 35.

Here the ends of the straps 39 are fixed to the floor 4, for example by means of a spring-clip (not shown) that clips onto a loop fastened to the floor 4 under the seats 9.

The other end of each strap 39 extends around the bed 30 and is clamped by a self-locking buckle.

The base 32 further includes two circular openings 38 each in the vicinity of one shaft 35.

The openings 38 are adapted to be positioned over loudspeakers (not shown) fitted into the parcel shelf 13. An alternative is for the vehicle 1 to include loudspeakers situated elsewhere in the passenger compartment of the vehicle—or not to include any loudspeakers—and for the base not to include any openings 38.

In the vicinity of each end of the edge 37, the base 32 carries a metal shaft 35 around which a side rail 33 is adapted to pivot.

Each side rail 33 is made of metal and includes a first section 41 able to pivot about a shaft 35 and a second section 42 at the end opposite the shaft 35.

At one end of the section 41 of each side rail 33 the latter is fastened to an annular ring 46 engaged around the shaft 35. At the free end of the shaft 35 the latter has a diameter slightly greater than the inside diameter of the ring 46 to prevent the side rail 33 escaping.

The first section 41 is a U-section and therefore has a groove 43 forming a slideway.

It carries, on the side opposite the shaft 35, a metal plate 44 having a bent return forming a hook. This plate 44 is welded to the outside of said side rail 33.

The plate 44 carries on its outside a clipping finger 48 cooperating with corresponding clipping means of a spacer 47.

The second section 42 is also a U-section. The dimensions of the second section 42 are such that the second section 42 can slide inside the groove 43 of the first section 41.

Figure 12:
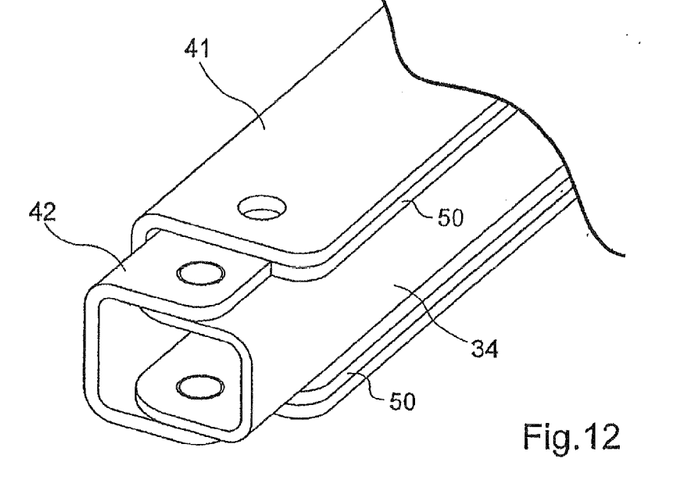
FIG. 12 is an enlarged view of the detail XII from FIG. 11.

As seen in FIG. 12, the section 41 carries on its interior surface two facing strips 50 of increased thickness to form a slide for the section 42.

The end of the first section 41 opposite the shaft 35 and the ends of the second section 42 each include an end of travel stop to limit the travel of the second section 42 relative to the first section 41 in both directions.

One of the two side rails 33 also carries in the slideway formed in the two sections 41, 42 the crossmember 34 that is mounted to pivot on the free end of the section 42.

The crossmember 34 occupies substantially all the length of the side rail 33 when the section 42 is inside the section 41.

Each side rail 33 therefore has a retracted position in which the second section 42 is in contact over all its length with a portion of the first section 41 and a deployed position in which the first section 41 and the second section 42 are in contact only at one of their ends.

Each side rail 33 pivots about its shaft 35 and can take up a transverse position in which the side rail 33 rests on the base 32 parallel to the main edges of the base 32 or a longitudinal position in which the side rail 33 projects from the base 32 transversely to the transverse position.

When it is in its transverse position, the side rail 33 is also in its retracted position. When it is in its longitudinal position, the side rail 33 can be in its retracted position or in its deployed position.

The length of the side rail 33 in the retracted position is slightly less than the distance between the two shafts 35.

In the deployed position, the groove of the section 42 is in line with the groove 43 of the section 41 of the side rail 33.

In the longitudinal and deployed position of the side rails 33, the crossmember 34 is deployed and fixed to the end of the other side rail 33, here by a shaft fixed by a split pin (not shown).

In the deployed position of the side rails 33, each carries a spacer 47. Each spacer 47 comes into contact with a lateral wall 3 of the passenger compartment 2.

The thickness of the spacers 47 is such that the side rails 33 are parallel in the deployed position.

On the base 32 two rigid supports 45, here of composite material, extend from the shafts 35 and parallel to the nearby edges of the lateral walls 3. The supports 45 are oriented in line with the side rails 33 in the deployed position.

Each support 45 is an L-section positioned so that the respective horizontal branches point toward each other.

The mattress support of the bed 30 according to the invention is formed by a series of wooden slats 36 that consist of elongate thin plates. Their length corresponds to the difference between the two supports 45.

Here the mattress support includes fourteen slats 36. As seen in FIG. 6, in the stowed position of the frame 31, all the slats 36 are disposed upright, one against the other and resting on the base 32.

Here the width occupied by this series of slats 36 is slightly less than the length of the supports 45.

Figure 8:
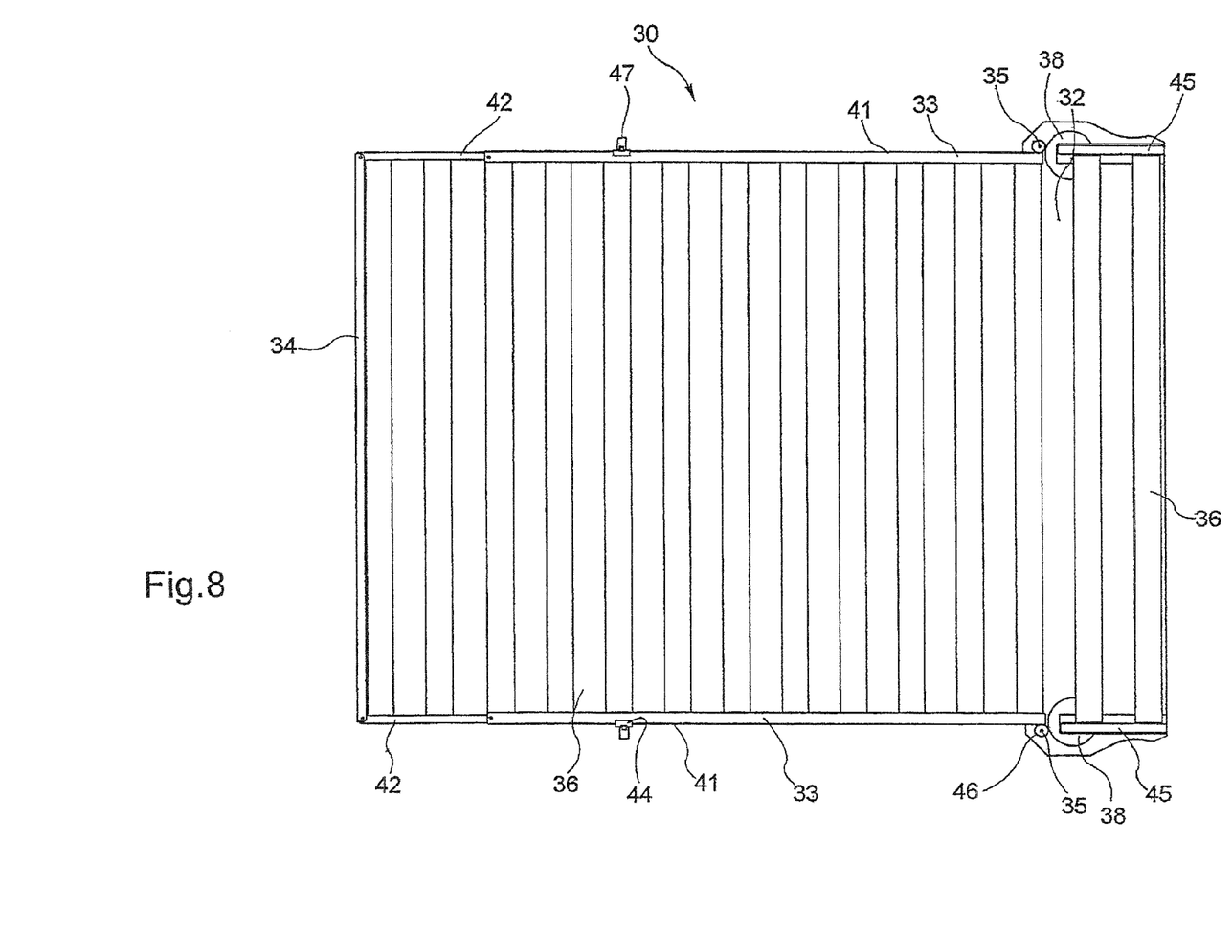
FIG. 8 is a plan view of the bed represented in FIG. 2.
Figure 9:
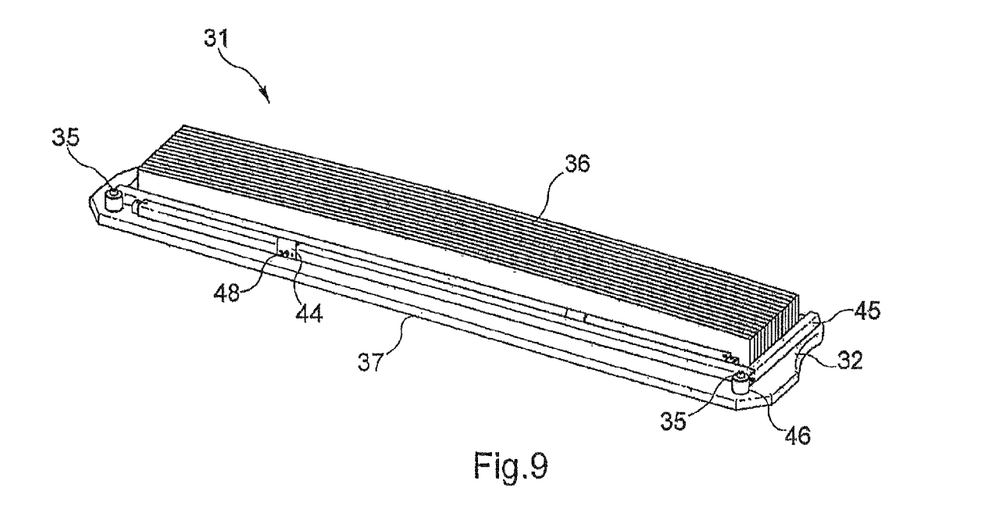
FIG. 9 is a perspective view of the bed represented in FIG. 6.
Figure 10:
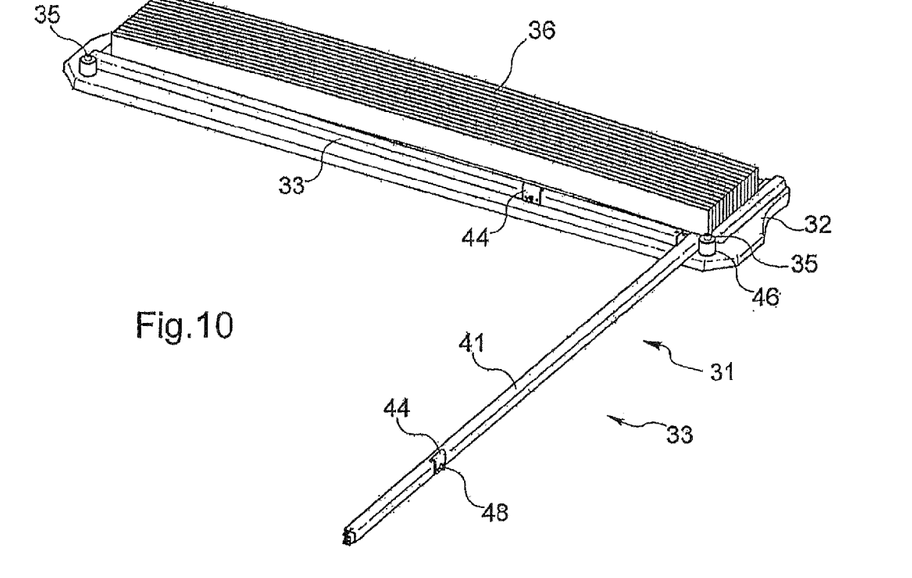
FIG. 10 is a perspective view of the bed from FIG. 9 in which one of the two side rails is in a longitudinal and retracted position.

When the frame 31 is in the position of use, as seen in FIG. 8, the slats 36 are spread out. They are slightly curved toward the ceiling of the passenger compartment 2. Two slats 36 are supported by the supports 45, to be more precise by the horizontal branches of the supports 45. The other slats 36 are spread out between the two side rails 33 and are retained by the latter thanks to the grooves 43 and thanks to the grooves in the second sections 42 of the side rails 33.

Figure 3:
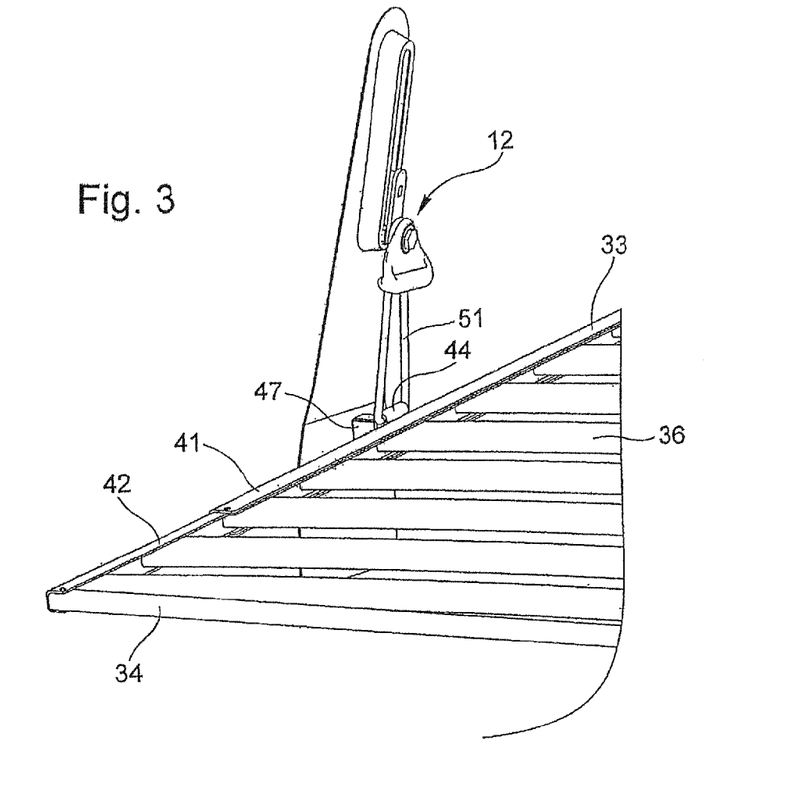
FIG. 3 is a perspective view of the retaining means from FIG. 2.

As seen in FIGS. 2 and 3, the bed 30 is retained not only by the rear parcel shelf but also by two flexible ties 51 such as cords.

Each cord 51 forms a closed loop. That loop is engaged in the bent return 44 and over the anchor point 12. At the anchor point 12, the cord 51 passes behind the triangular bracket through which the seat belt (not shown) passes, above the bolt securing this bracket.

Figure 5:
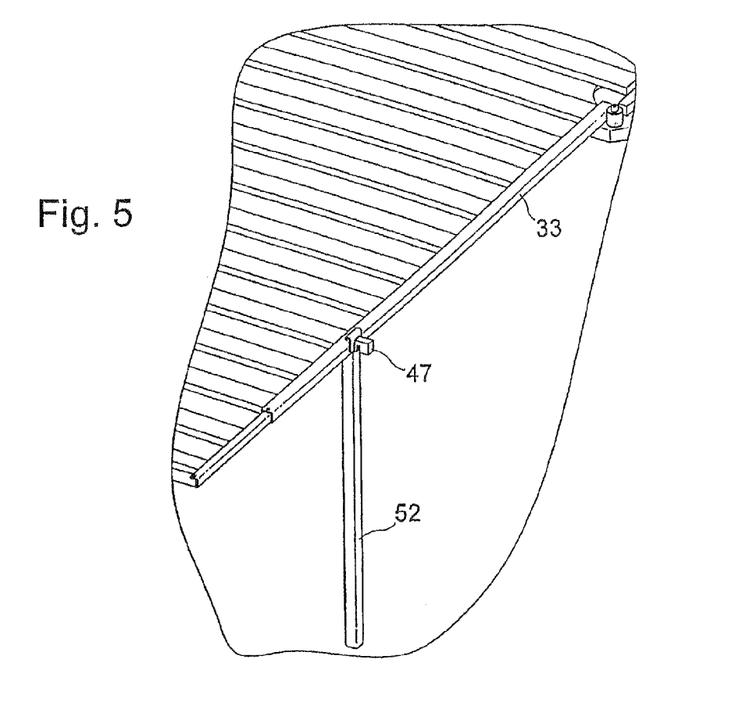
FIG. 5 is a perspective view of the retaining means from FIG. 4.

In a variant represented in FIG. 5, the bed 30 does not include flexible ties 51 for hooking the side rails 33 onto an anchor point 12, but two legs 52 enabling the side rails 33, and therefore the bed 30, to rest directly on the floor 4 of the vehicle 1. Here each leg 52 is mounted on a side rail 33 at the level of the plate 44 on the clip finger 48 cooperating with corresponding clipping means on the leg 52.

An alternative, in the absence of the plate 44, is for mutual fixing means to be provided on the leg and on the side rail.

On its outside, the leg includes another clip finger to cooperate with the spacer 47.

As seen in FIG. 2, the bed 30 also includes a mattress 53 with dimensions substantially equivalent to those of the deployed frame 31. The mattress 53 is an inflatable mattress and inflated when it is positioned on the slats 36. In variants of this embodiment a foam mattress is used or a plurality of mattresses.

Fitting a bed 30 according to the invention is described next with reference to FIGS. 9 to 15 and 18.

When the bed is not being used (FIG. 9), the frame 31 is in the stowed position and the slats 36 are positioned upright on the base 32 one against the other. All of the parts of the bed are stowed in a cover, for example.

Once the bed has been obtained (step I, FIG. 18), the frame 32 is positioned on the rear parcel shelf 13 and they are fixed together and to the bodywork by means of straps 39 (step II, FIG. 16) and the vehicle can be used in the normal way.

An alternative is for all of the slats to be stowed in the boot of the vehicle independently of the base.

Figure 18:
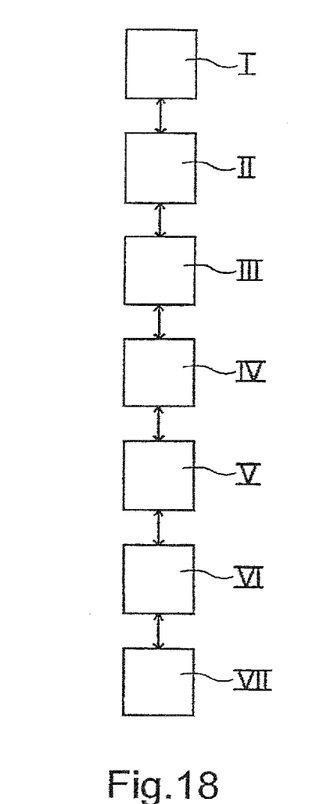
FIG. 18 is a diagrammatic representation of a method of fitting a motor vehicle with a bed according to the invention.

When the bed is to be used, the straps are undone, the seat backs 9 of the rear seat 7 are folded, and then the seat backs 9 of the front seats 6 are inclined on top of the rear seats 7 (step III, FIG. 18).

Figure 11:
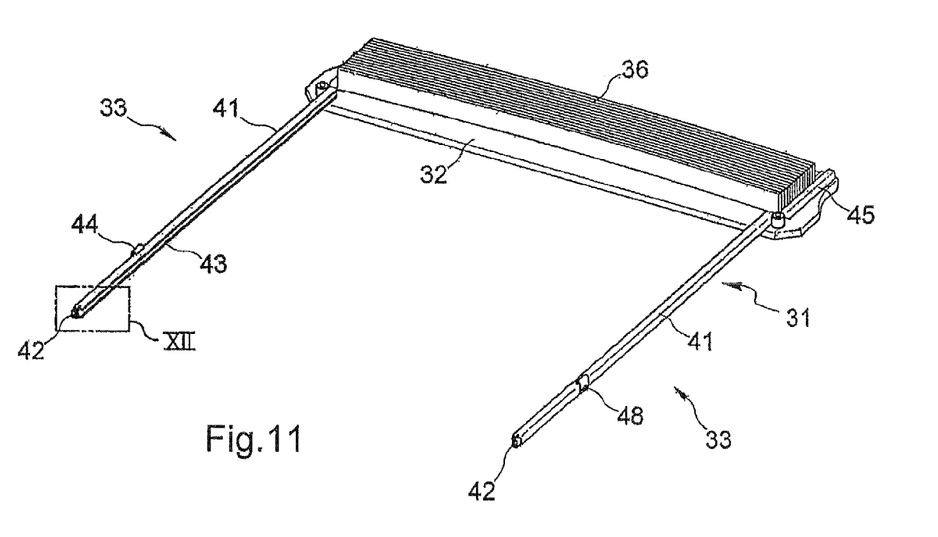
FIG. 11 is a view similar to that of FIG. 10 in which the two side rails are in a longitudinal and retracted position.

A first side rail 33 is moved from its transverse position to its longitudinal position (FIG. 10), and the second side rail 33 is then moved from its transverse position to its longitudinal position (FIG. 11).

The spacers 47 are clipped into place.

The cords are passed into the return of each plate 44 of the side rails 33 and behind the brackets of the anchor points 12 (step IV).

An alternative is, once the side rails have been deployed, to fix the legs 52 to the side rails 33 so that the frame can rest on the floor 4.

Figure 13:
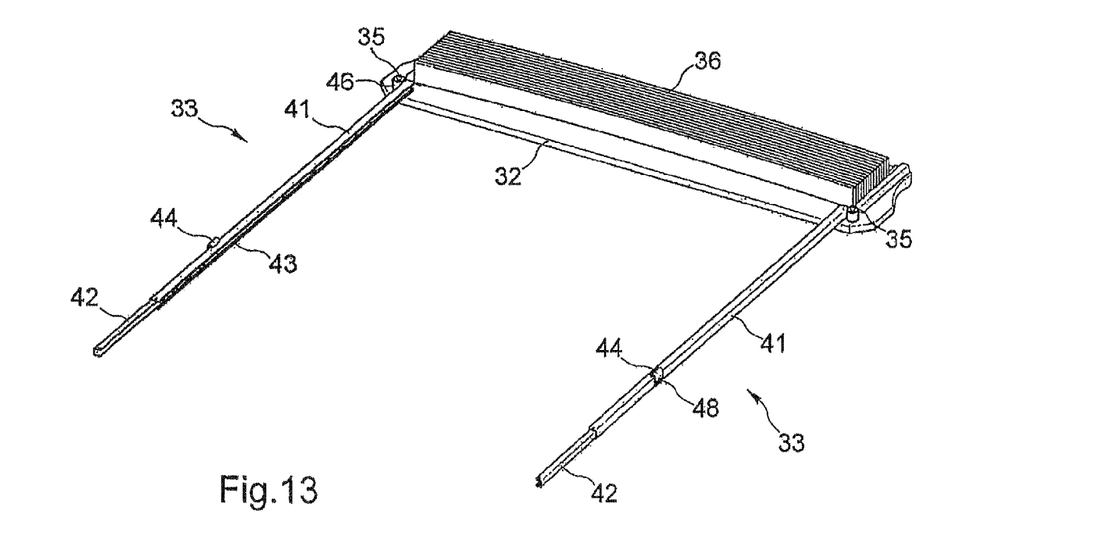
FIG. 13 is a view similar to that of FIG. 10 in which the two side rails are in a longitudinal and deployed position.
Figure 14:
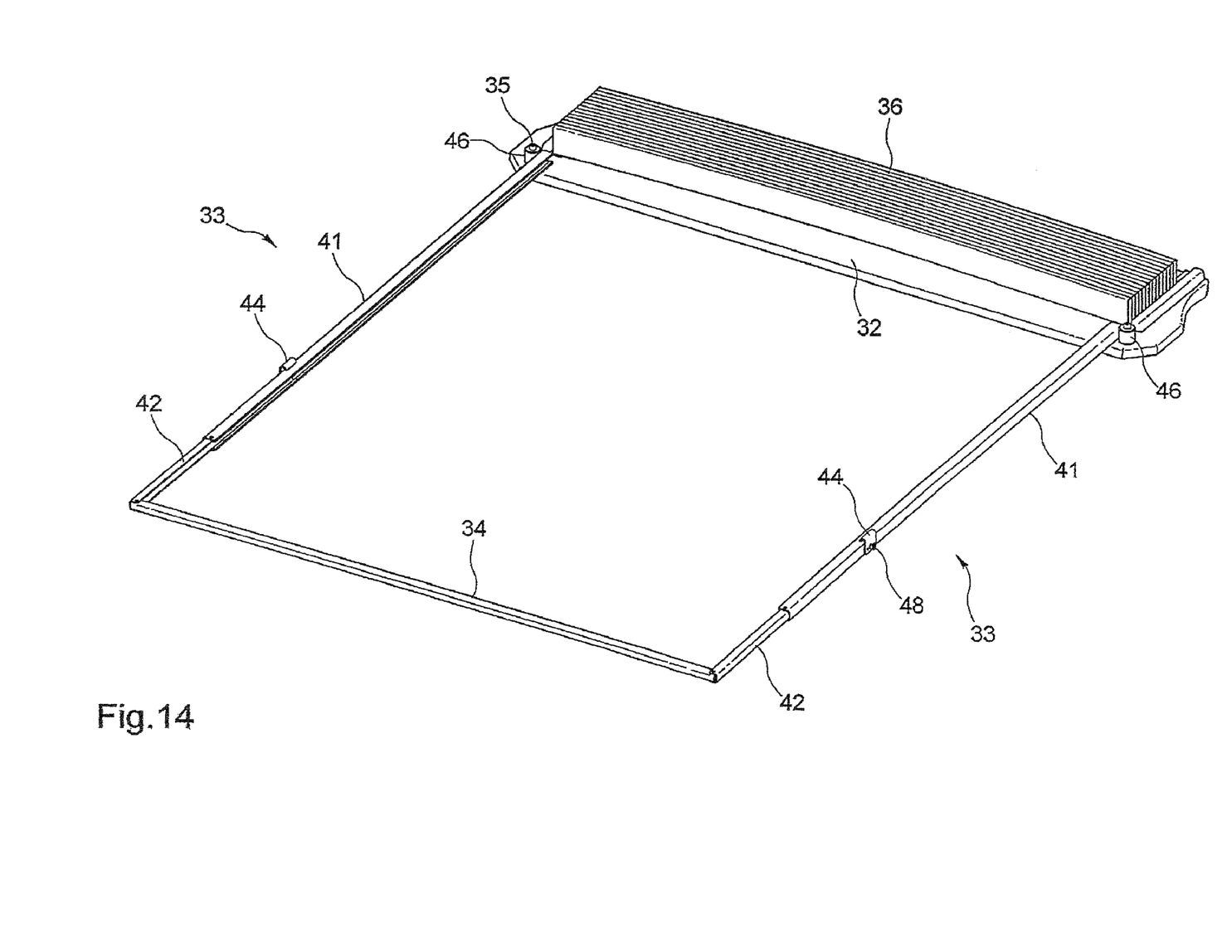
FIG. 14 is a view similar to that of FIG. 13, the crossmember being represented deployed between the side rails.

The side rails 33 are then moved from their retracted position to their deployed position by sliding the sections 42 in the sections 41 (FIG. 13, step V).

The crossmember 34 is deployed (step VI).

Figure 15:
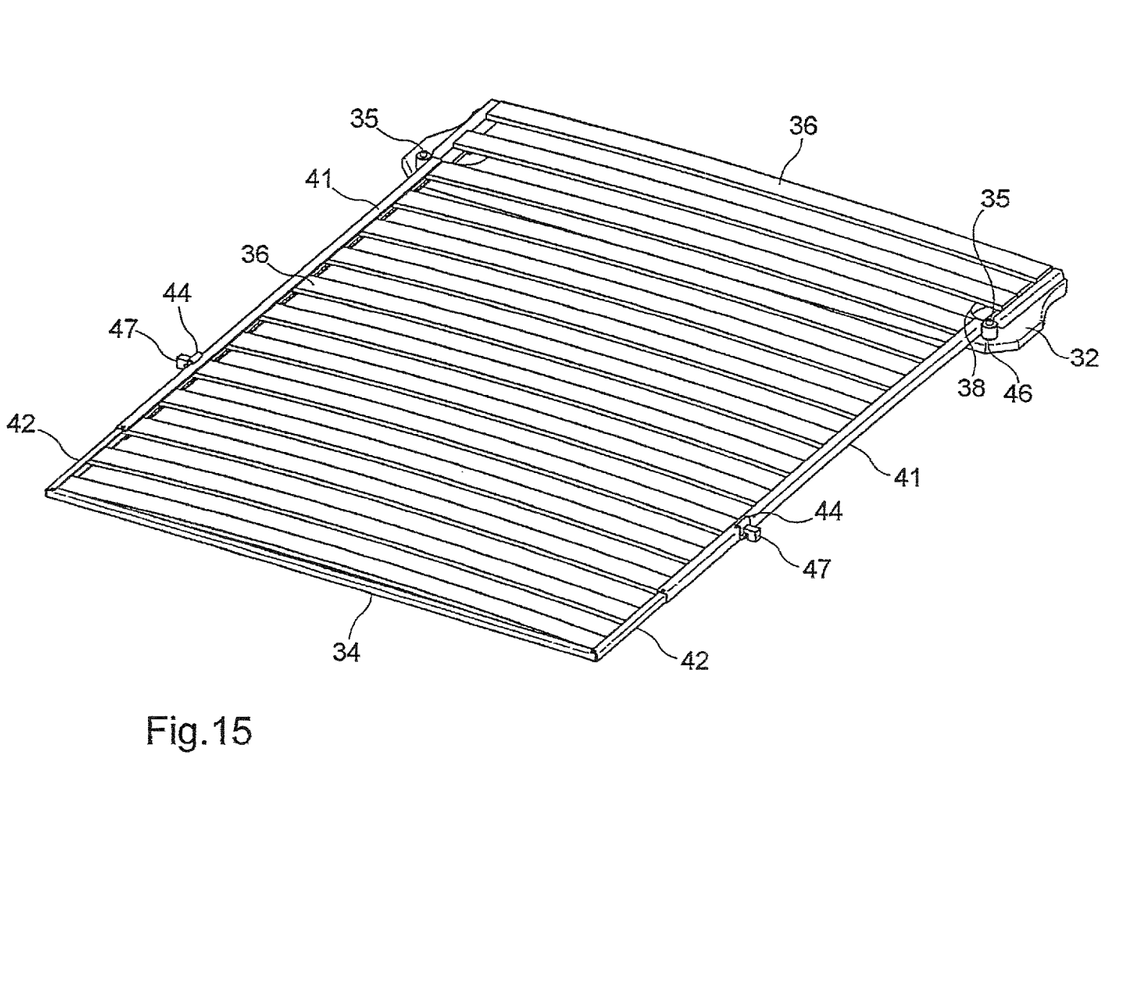
FIG. 15 is a perspective view of the bed in its position of use, the spacers being fixed to the side rails.

The slats 36 are then spread out over the entire length of the frame 31 thus formed (FIG. 15, step VII).

To complete the bed 30, the mattress 53 is then positioned on top of the slats 36 (step VIII), passing it through one of the opening panels of the vehicle, here the hatch 14.

Once the bed 30 is completely deployed, it can be accessed via the opening for the hatch 14.

To change the bed 30 from the state of use to the stowed state, the converse steps are carried out (represented diagrammatically in the same FIG. 10 by the steps VIII to III), namely:
- the mattress 53 is removed (step VIII);
- the slats 36 are placed upright on the base 32 (step VII);
- the crossmember 34 is stowed in the side rail 33 (step VI);
- the side rails 33 are moved from their longitudinal and deployed position to their transverse and retracted position (step IV);
- the cords 51 are unhooked from the anchor points 12 (alternatively, the legs 52 are removed) (step V);
- the seats 6, 7 are raised (step III).

A second embodiment of the bed according to the invention is described next with reference to FIGS. 16 and 17.

This bed also includes a folding frame 31, a base 32, two side rails 33, a crossmember 34, two shafts 35 and a plurality of slats 36.

These various elements are similar to those described for the bed 30 for vehicle passenger compartments.

The bed further includes two arms 90 and four feet 91.

A first end of each arm 90 is articulated to the end of a section 41 opposite the base 32.

When they are stowed, the arms 90 each extend under a section 41. When the frame 31 is in its position of use, the second end of each arm 90 is fixed under the crossmember 34 by means of appropriate fixing means (not shown).

In this position, the arms 90 prevent any movement of each side rail about its respective shaft 35.

Figure 17:
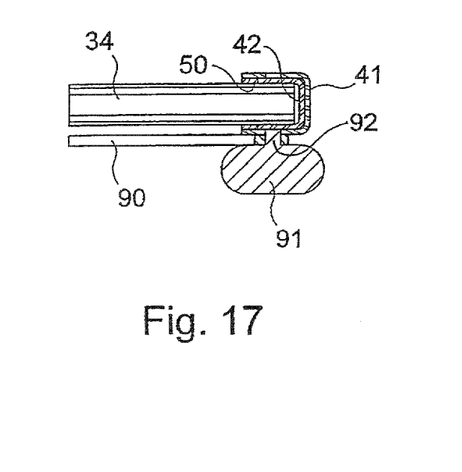
FIG. 17 is a view in section of a side rail in a plane XVII-XVII in FIG. 16.

As seen in FIG. 17, at each end of the arms 90 there is a foot 91 forming means for securing the side rails 33 to the floor on which the bed 30 is deployed.

The height of each foot 91 corresponds to that of the base 32.

Each foot 91 includes a stud 92 forming a shaft for an arm 90, the arm 90 including a bore through which the stud 92 passes.

The upper end of the stud 92 fills a bore in the lower wall of the section 41 and is stopped by the section 42 inside the section 41.

The crossmember 34 also includes bores intended for the studs 92 placed under the second end of the arms 90.

The bed 30 is installed in the same way as that described for the previous embodiment except that here the retaining means are replaced by the feet 91.

Figure 16:
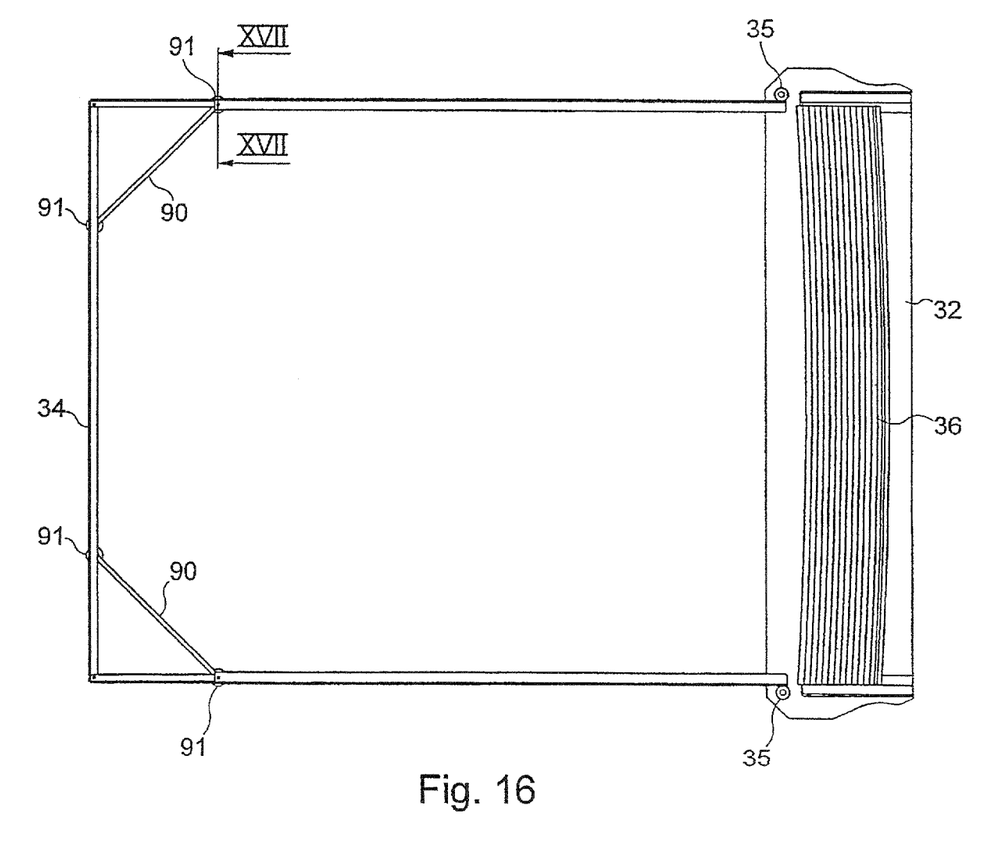
FIG. 16 is a plan view of a bed according to a second embodiment.

Once the bed 30 is in its position as shown in FIG. 16, the slats are spread out in the slides as before.

In the stowed position of the frame 32, the arms 90 and the feet 91 are separate from the side rails 33 and are fitted once the latter are in the deployed and longitudinal position.

The movement of the side rails from their retracted transverse position to their deployed longitudinal position has not been described in detail because it is the same as in the previous embodiment.

In a variant of this embodiment, the arms 90 are longer.

In another variant, other means are provided in place of the arms 90 to prevent rotation of the side rails 33.

In a further variant supplementary fixing means are provided for fixing together the feet, the arms and the side rails or the crossmember.

In a further variant, the arms are fixed to the side rails permanently and allow rotation and are folded under the side rails in the stowed position of the frame. Feet are added in the longitudinal position of the arms.

According to variants of the embodiment of the bed for vehicles:
- at the rear, the vehicle includes door type opening panels with vertical lateral pillars, or a hatch with two panels, one opening upward and the other downward; and/or
- the front and rear seats incline and fold in other arrangements; and/or
- the side rails and the slats are made of plastic material; and/or
- the number of slats is different; and/or
- the hook in which the cord engages is a ring and the cord remains attached to the side rails in their stowage position or their position of use; and/or
- the slats are joined together by a flexible strip of woven fabric stapled to each slat; and/or
- the vehicle does not include a rear parcel shelf but includes trim type members projecting from the lateral walls so that the base is positioned directly on those projecting elements. Fixing means or clipping means between the base and the projecting elements are also possible; or
- the base is placed directly on the inclined rear seats; and/or
- the flexible ties hook onto an anchor point such as a hook provided on the pillar of the lateral wall; and/or
- the leg is pivotally mounted on the side rail and remains fixed to it even when the side rail is in the retracted and transverse position; and/or
- the spacers cannot be removed from the side rails; and/or
- the fitting steps are effected in a different order.

According to another embodiment, the bedframe includes a mattress support formed without slats, for example by means of a net or a blind rolled up under the support base and that is deployed along the grooves of the two side rails until it occupies the whole of the space delimited by the side rails, the crossmember and the support base.

According to a further embodiment, the bedframe includes feet and retaining means for a flexible tie or feet and removable legs so that the bed can be used on the floor or held away from the floor in a vehicle.

The invention claimed is:

1. Bedframe, adapted to accommodate a mattress support, characterized in that it includes:
   - a base (32),
   - two telescope side rails (33) each having a retracted position and a deployed position,
   - means (35, 46) for pivotal mounting of each of said side rails (33) on said base (32) so that each of said side rails (33) can assume a transverse position and a longitudinal position, said bedframe (31) having a stowed position in which said rails (33) are each in a retracted and transverse position on said base (32) and a position of use in which said side rails (33) are each in a deployed and longitudinal position, and on the side opposite said base, means (51, 52, 90, 91) for retaining said side rails (33) in the deployed and longitudinal position, wherein one of said side rails (33) accommodates a crossmember (34), said crossmember (34) being adapted to be disposed between said side rails (33) when each of them is in a deployed and longitudinal position.

2. Bedframe according to claim 1, characterized in that said base (32) is adapted to be supported by first predetermined elements (31) of a motor vehicle passenger compartment (2) and said retaining means (51, 52) include a member extending between said side rails (33) and predetermined second elements (12, 4) of said passenger compartment (2).

3. Frame according to claim 2, characterized in that each of said side rails (33) includes, on the outside, a spacer (47) adapted to come into contact with a lateral wall (3) of said passenger compartment (2).

4. Frame according to claim 2, characterized in that said retaining means include a flexible tie (51) adapted to be engaged at one end with one of said side rails (33) and at the other end with an anchor point (12) of said passenger compartment (2).

5. Frame according to claim 4, characterized in that said flexible tie (51) is adapted to be engaged at the other end with an upper safety belt anchor point (12).

6. Frame according to claim 4, characterized in that each of said side rails (33) include retaining means with which said flexible tie (51) is adapted to interengage.

7. Frame according to claim 2, characterized in that said retaining means include a removable leg (52) adapted to be fixed to one of said side rails (33) and to bear on the floor (4) of said passenger compartment (2).

8. Frame according to claim 2, characterized in that it includes two openings (38) disposed at a distance from each other on said base (32).

9. Frame according to claim 1, characterized in that said retaining means include at least one foot (91) engaged with one of said side rails (33), said base (32) and said foot (91) being adapted to rest on the floor.

10. Frame according to claim 9, characterized in that said retaining means include at least one arm (90) extending obliquely from one of said side rails (33) to a crossmember (34).

11. Frame according to claim 10, characterized in that it includes two of said arms (90).

12. Frame according to claim 11, characterized in that it includes common means (92) for fixing said foot (91) and said arm (90) to said side rail (33).

13. Frame according to claim 1, characterized in that said pivotal mounting means include two shafts (35) spaced from each other on said base (32), each of said shafts receiving a ring (46) belonging to a respective one of said side rails (33).

14. Frame according to claim 1, characterized in that said side rails (33) each include a slideway (43) facing the slideway (43) of the other side rail (33).

15. Bed characterized in that it includes a frame (31) according to claim 14 and a mattress support including a plurality of slats (36), said bed (30) assuming a stowed state in which said frame (31) is in its stowed position and said slats (36) are stowed on said base (32), and a state of use in which said frame (31) is in its position of use while said slats (36) are spread out in said slideways (43).

16. Bed according to claim 15, characterized in that, in the state of use of said bed (30), said slats (36) are disposed lying down in a plane defined by said side rail (33) and said base (32) while in the stowed state of said bed (30) said slats (36) are one against the other, disposed upright, on said base (32).

17. Bed according to claim 15, characterized in that it further includes a mattress (53) adapted to be spread out on said slats (36) when said frame (31) is in its position of use.

18. Method for providing a motor vehicle with a bed, characterized in that it includes the step of procuring a bed (30) according to claim 15, the step of placing said base (32) on predetermined first elements (13) of said vehicle (1), and:

to change said bed (30) from said stowed state to said state of use:

each of said side rails (33) is moved from its retracted and transverse position to its deployed and longitudinal position;

each of said side rails is connected to said second predetermined elements (12, 4) of said vehicle (1) by said retaining means (51, 52);

said slats (36) are spread out in said slideways (43) of said side rails (33); and to change said bed (30) from the state of use to the stowed state:

said slats (36) are stowed upright on said base (32), said side rails (33) are separated from said second elements (12, 4);

each of said side rails (33) is moved from its deployed and longitudinal position to its retracted and transverse position.

19. Method according to claim 18, characterized in that it includes the step of placing said base (32) on a rear parcel shelf (13) of said vehicle (1), said rear parcel shelf (13) then forming said first fixed elements.

20. Method according to claim 18, characterized in that it includes the step of inclining the seats (6, 7) of said vehicle (1) before moving each of said side rails (33) from its transverse position to its longitudinal position.

21. Method according to claim 18, characterized in that it includes the step of engaging a flexible tie with, on the one hand, retaining means appropriate to each of said side rails (33) and, on the other hand, an anchor point (12) of the passenger compartment (2) of said vehicle (1).

22. Method according to claim 18, characterized in that it includes the step of deploying on each of said side rails (33) a removable foot (52) bearing on the floor of the passenger compartment (2) of said vehicle (1).

23. Method according to claim 18, characterized in that it includes the step of disposing a crossmember (34) between said side rails (33), each in a deployed and longitudinal position, opposite said base (32).

24. Method according to claim 18, characterized in that it includes the step of placing a mattress (53) on said slats (36) through opening panels (14) of said vehicle (1).

25. Bedframe according to claim 1, wherein each of said telescope side rails has a variable length and includes a first section (41) and a second section (42) that is slidable relative to said first section to vary the length of said side rail.

26. Bedframe according to claim 25, wherein both of said sections have support surfaces that are in line to support the mattress support at positions of said side rails between the retracted position and the deployed position.

27. Bedframe, adapted to accommodate a mattress support, characterized in that it includes:

a base (32), two telescope side rails (33) each having a retracted position and a deployed position, means (35, 46) for pivotal mounting of each of said side rails (33) on said base (32) so that each of said side rails (33) can assume a transverse position and a longitudinal position, said bedframe (31) having a stowed position in which said rails (33) are each in a retracted and transverse position on said base (32) and a position of use in which said side rails (33) are each in a deployed and longitudinal position, and on the side opposite said base, means (51, 52, 90, 91) for retaining said side rails (33) in the deployed and longitudinal position, and characterized in that said base (32) is adapted to be supported by first predetermined elements (31) of a motor vehicle passenger compartment (2) and said retaining means (51, 52) include a member extending between said side rails (33) and predetermined second elements (12, 4) of said passenger compartment (2), and characterized in that said retaining means include a flexible tie (51) adapted to be engaged at one end with one of said side rails (33) and at the other end with an anchor point (12) of said passenger compartment (2), and characterized in that each of said side rails (33) include retaining means with which said flexible tie (51) is adapted to interengage, and, characterized in that, for each of said side rails (33), said retaining means include a plate (44) fixed to said side rail (33) and having a return, forming a hook, projecting from said side rail (33).

28. Frame according to claim 27, characterized in that, each of said side rails (33) including, on the outside, a spacer (47) adapted to come into contact with a lateral wall (3) of said passenger compartment (2), said plate (44) and said spacer (47) include mutual fixing means (48).

* * * * *